United States Patent [19]

Tobias

[11] 4,383,058

[45] May 10, 1983

[54] EPOXY-AMINE COPOLYMER REACTION PRODUCT AND AQUEOUS COATING COMPOSITIONS THEREOF

[75] Inventor: Michael A. Tobias, Bridgewater, N.J.

[73] Assignee: Mobil Oil Corporation, New York, N.Y.

[21] Appl. No.: 221,649

[22] Filed: Dec. 31, 1980

[51] Int. Cl.$^3$ ............................................. C08L 63/00
[52] U.S. Cl. .................................... 523/411; 523/412
[58] Field of Search ............... 260/29.6 R, 29.4 UA, 260/29.3, 29.6; 525/217, 113; 523/411, 412

[56] References Cited

U.S. PATENT DOCUMENTS

| | | | |
|---|---|---|---|
| 4,167,499 | 9/1979 | Hazan | 260/29.4 UA |
| 4,246,089 | 1/1981 | Hazan | 260/29.4 UA |
| 4,285,847 | 8/1981 | Ting | 260/29 |
| 4,289,674 | 9/1981 | Christenson et al. | 260/29.4 UA |

*Primary Examiner*—John Kight, III
*Assistant Examiner*—Amelia B. Yarbrough
*Attorney, Agent, or Firm*—Charles A. Huggett; Michael G. Gilman; Edward J. Trojnar

[57] ABSTRACT

Non-gelled compositions containing amine groups and substantially free of oxirane groups are disclosed which are the reaction product of
 (a) addition copolymer containing primary or secondary amino groups; and
 (b) a polyepoxide. The resulting composition is self-emulsifiable in water and is useful for coatings, particularly for metal.

6 Claims, No Drawings

EPOXY-AMINE COPOLYMER REACTION PRODUCT AND AQUEOUS COATING COMPOSITIONS THEREOF

BRIEF DESCRIPTION OF THE INVENTION

This invention relates to compositions suitable for coatings. In particular, the compositions of this invention are self-emulsifiable in water, comprise a non-gelled reaction product of epoxy and amine functional additional copolymer, contain free amino groups, and are substantially free of oxirane functionality.

The amine containing addition copolymer is a solution copolymer of monoethylenically unsaturated monomers comprising at least about 10 weight percent of alpha, beta-monoethylenically unsaturated primary or secondary amines, based on the total weight of monomers. The epoxy resins constitutes at least about 25 weight percent of the total resin solids content and has sufficient oxirane groups to provide a ratio of oxirane groups to amine groups copolymer of from 0.5:1 to 0.05 to 1. The resulting compositions are self-dispersible in water and are useful as coatings, particularly as metal primers containing pigment, which are cured by baking.

DETAILED DESCRIPTION OF THE INVENTION

Epoxy resins, particularly those containing a plurality of aromatic groups, are joined together by ether linkages and provide excellent physical and chemical properties. It has been difficult to employ such resins in aqueous media because they lack storage stability. This often is desirable and is of particular importance when spray application is contemplated. The slightest change in the pH of the aqueous composition as a result of hydrolytic instability results in a marked change in the viscosity and application properties of the coating.

To obtain aqueous coatings of proper resin solids content and viscosity, it has often been necessary in the trade to employ an emulsion system in which a water immiscible component is suspended in an aqueous continuous phase with an emulsifying agent. Such emulsion systems are intrinsically unpredictable since the particle size of the emulsion will vary with the agitation of the composition. This invention provides self-emulsifiable compositions in which the particle size of the emulsion is substantially the same regardless of whether high speed agitation is used or whether the mixture with water is barely stirred.

In general, any polyfunctional epoxy resin containing more than one 1,2-epoxy group and having an epoxy equivalent weight of 200 to about 4000 can be used to prepare the compositions of this invention. Preferably, the epoxy resin is an aromatic polyether polyepoxide.

Aromatic polyethers, polyether epoxides and particularly diglycidyl ethers, are well known and available in commerce. The usual aromatic polyether backbone of the epoxy resin is based on a bisphenol which defins a pair of phenolic groups joined together through an intervening divalent hydrocarbon. The preferred bisphenols have the formula:

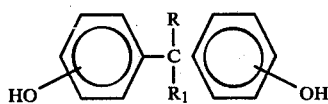

in which R and $R_1$ are hydrogen or alkyl groups containing up to 8 carbon atoms. Bisphenol A is particularly preferred. In this compound, the two OH groups are in the para position and R and $R_1$ are each methyl.

The other essential component of the compositions of this invention is an addition copolymer of monoethylenically unsaturated monomers comprising at least about 10 weight percent of alpha, beta-monoethylenically unsaturated aliphatic primary or secondary amine, based on the total weight of monomers. The balance of the copolymer is preferably non-reactive under the contemplated conditions of polymerization, prereaction with the epoxy resin, and cure, but small amounts of other reactive monomers may be tolerated. Examples of other suitable reactive monomers are hydroxy monomers such as 2-hydroxy ethyl methacrylate, amide monomers such as acrylamide, and N-methylol monomers such as N-methylol acrylamide.

The non-reactive monomers are, for example, acrylate and methacrylate esters, such as ethyl acrylate, methyl methacrylate or isobutyl methacrylate, styrene, para-methyl styrene, vinyl toluene, vinyl acetate, vinyl chloride, vinylidene chloride, acrylonitrile, and the like. Their function is to enhance solvent solubility and film formation.

The amine-functional monomer must be present in the addition copolymer in a relatively high amount so that the final reaction product will contain the requisite amine groups. The preferred minimum proportion of amine monomer is 10 weight percent of the weight of the monomers. Up to about 80 weight percent of the monomers can be amine functional, but the maximum proportion is more generally determined by retention of solvent solubility of the copolymer. Generally, the amine monomer content is in the range of 20-60 weight percent.

Suitable amines include primary and secondary amino alkyl acrylates which contain up to about four carbon atoms in the alkyl moiety and which can have an alkyl substituent on the amino nitrogen of up to about four carbon atoms. The alkyl radical can be further substituted by hydroxy or the like.

The reaction between the oxirane groups of the epoxy resin and amine groups of the addition copolymer is normally carried out in the presence of a small amount of an acid catalyst. The catalyst is normally used in an amount of from 1 to 10 weight percent of the materials subjected to reaction. Preferably, the catalyst comprises 3 to 5 weight percent of the reactants.

Suitable acid catalysts include low molecular weight aliphatic carboxylic acids such as acetic acid and substituted carboxylic acids such as glycolic acid. The proportions of epoxy resin and amine addition copolymer are such that the ratio of oxirane groups in the epoxy resin to the amino groups in the addition copolymer is from 0.5:1 to 0.05:1, preferably 0.25:1 to 0.1:1.

The compositions of this invention form films with good properties on baking in the absence of external curing agent. However, from 1-25 weight percent of the curing agents such as aminoplast resins, phenoplast resins and mixtures thereof can serve to enhance the cure.

The preferred curing agents are water dispersible. These will be illustrated by hexamethoxy methyl melamine, or by A stage phenol-formaldehyde resols. However, the compositions of this invention are emulsions and water dispersibility in the curing agent is not essential.

The resins of this invention are typically prepared in a volatile organic solvent. A wide variety of solvents are suitable. In general, any solvent which does not interfere with the achievement of an emulsion when the product is diluted with water can be used.

Organic solvents of limited water miscibility, such as xylene, toluene, and butanol are useful, and they may be used alone or together with water miscible solvents, such as 2-ethoxy ethanol or methyl ethyl ketone.

The aqueous coating compositions of this invention are primarily useful for coating aluminum, tinplated steel, pretreated metals, steel, or metals coated with the same or different resin compositions, i.e., a second coat. These aqueous compositions also can be used for coating other substrates, such as wood. The most preferred and advantageous use of the coating compositions is metal coatings containing pigments, e.g. 1 to 60 weight percent. After application, the coating is baked for about 5 seconds to about 30 minutes at between about 250° F. and about 600° F. A typical bake is for about 2 minutes at about 400° F.

The invention is illustrated in the following non-limiting examples. Proportions are by weight.

EXAMPLE 1

A 5-l flask was charged with 1460.0 gms of Cellosolve which was subsequently heated to 115° C. under a nitrogen atmosphere. A mixture of 600.0 gms of t-butylaminoethyl methacrylate, 375.0 gms of methyl methacrylate, 525.0 gms of butyl acrylate and 37.5 gms of t-butylperbenzoate was added dropwise over a four hour period. The reaction mixture was held for an additional hour at 115° C. and then cooled to ambient temperature. The resulting acrylic copolymer had a Gardner-Holdt viscosity of M+ at 25° C.

EXAMPLE 2

A 250 ml Erlenmeyer flask, containing a small magnetic stirring bar, was charged with 50.0 gms of the product from Example 1 and 3.8 gms of glycolic acid. The mixture was heated to 70° C. to dissolve the acid whereupon 35.0 gms of Epon 1007 was added incrementally while heating to 118° C. Four minutes later, at 133° C., the solid epoxy resin had melted to afford a visually heterogeneous reaction mixture. Fourteen minutes later, at 128° C., the reaction mixture was visually homogeneous. The reaction mixture was held for an additional 9 minutes at 128°–135° C. at which point 100.0 gms of deionized water was added. The reaction product readily formed an aqueous dispersion with a Brookfield viscosity of 35 cps (spindle #1, speed 60) and a pH of 6.17.

I claim:

1. A non-gelled composition comprising an adduct containing amino groups and substantially free of oxirane groups, which adduct is the reaction product of
   (a) an amine containing copolymer comprising a solution copolymer of alpha, beta-monoethylenically unsaturated monomers containing at least 10 weight percent of alpha, beta-monoethylenically unsaturated monomer containing primary or secondary amino groups based on the total weight of the monomers; and
   (b) an epoxy resin containing free oxirane groups which consists of a bisphenol A-epichlorohydrin epoxy having an epoxy equivalent weight of between 200 and 4000.

2. The composition of claim 1 in which said amine containing copolymer comprises polymerized acrylate or methacrylate esters and at least 10 weight percent of a primary or secondary amino acrylate or methacrylate.

3. The composition of claim 1 which is emulsified in water in the substantial absence of added emulsifying agent.

4. The composition of claims 1 or 2 in which said monoethylenically unsaturated amine monomer is t-butylaminoethyl methacrylate.

5. The composition of claim 1 which further contains from 1 to 25 weight percent of a curing agent selected from aminoplast resins, phenoplast resins, and mixtures thereof, based on the weight of the total resin content.

6. A stable aqueous emulsion comprising the composition of claim 1 in which water is present in an amount to provide a solids content of about 10 to 50 percent.

* * * * *